(12) United States Patent
Szoucsek

(10) Patent No.: US 12,188,620 B2
(45) Date of Patent: Jan. 7, 2025

(54) CONTROL UNIT AND METHOD FOR OPERATING A PRESSURE VESSEL VALVE OF A PRESSURE VESSEL

(71) Applicant: Bayerische Motoren Werke Aktiengesellschaft, Munich (DE)

(72) Inventor: Klaus Szoucsek, Zirndorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 258 days.

(21) Appl. No.: 17/924,744

(22) PCT Filed: Apr. 20, 2021

(86) PCT No.: PCT/EP2021/060171
§ 371 (c)(1),
(2) Date: Nov. 11, 2022

(87) PCT Pub. No.: WO2021/228508
PCT Pub. Date: Nov. 18, 2021

(65) Prior Publication Data
US 2023/0184388 A1    Jun. 15, 2023

(30) Foreign Application Priority Data
May 12, 2020  (DE) .............. 10 2020 112 830.4

(51) Int. Cl.
*F17C 13/04*     (2006.01)
*H01M 8/04082*   (2016.01)
*H01M 8/04225*   (2016.01)

(52) U.S. Cl.
CPC ......... *F17C 13/04* (2013.01); *H01M 8/04201* (2013.01); *H01M 8/04225* (2016.02);
(Continued)

(58) Field of Classification Search
CPC .............. F17C 13/04; F17C 2205/0323; F17C 2221/012; F17C 2270/0184;
(Continued)

(56) References Cited

U.S. PATENT DOCUMENTS

| 8,945,787 B2 | 2/2015 | Asano et al. | |
| 8,993,186 B2 * | 3/2015 | Furusawa | H01M 8/2483 429/442 |

(Continued)

FOREIGN PATENT DOCUMENTS

| DE | 10 2016 215 323 A1 | 2/2018 |
| EP | 1 653 148 A1 | 5/2006 |
| WO | WO 2013/139459 A2 | 9/2013 |

OTHER PUBLICATIONS

International Search Report (PCT/ISA/210) issued in PCT Application No. PCT/EP2021/060171 dated Jul. 6, 2021 with English translation (five (5) pages).

(Continued)

*Primary Examiner* — Kevin F Murphy
(74) *Attorney, Agent, or Firm* — Crowell & Moring LLP

(57) ABSTRACT

A control unit is provided for a pressure vessel system having at least one pressure vessel with a pressure vessel valve designed to convey fuel from the pressure vessel into a discharge line in order to supply an energy converter. The control unit is configured to determine that a reduced-power operating mode of the energy converter is present, wherein, in the reduced-power operating mode, the fuel mass flow for supplying the energy converter is less than or equal to a predefined mass flow threshold value. The control unit is further configured to cause the pressure vessel valve to be intermittently opened during the execution of the reduced-power operating mode, in order to convey in each case a surge of fuel from the pressure vessel into the discharge line.

16 Claims, 3 Drawing Sheets

(52) U.S. Cl.
CPC .......................... *F17C 2205/0323* (2013.01);
*F17C 2221/012* (2013.01); *F17C 2250/03* (2013.01); *F17C 2250/043* (2013.01); *F17C 2270/0184* (2013.01)

(58) Field of Classification Search
CPC ......... H01M 8/04201; H01M 8/04225; H01M 8/043; H01M 8/04302; H01M 8/04753
See application file for complete search history.

(56) References Cited

U.S. PATENT DOCUMENTS

| | | | | |
|---|---|---|---|---|
| 9,048,500 | B2* | 6/2015 | Yumiya | H01M 8/04925 |
| 10,388,974 | B2* | 8/2019 | Shiokawa | H01M 8/04679 |
| 11,374,243 | B2* | 6/2022 | Okawachi | H01M 8/04201 |
| 11,791,483 | B2* | 10/2023 | Liphardt | H01M 8/04753 |
| | | | | 429/429 |
| 2006/0246177 | A1 | 11/2006 | Miki et al. | |
| 2007/0154751 | A1 | 7/2007 | Katano | |
| 2009/0014089 | A1 | 1/2009 | Takeshita et al. | |
| 2015/0047711 | A1 | 2/2015 | Van Doorn | |
| 2017/0179512 | A1* | 6/2017 | Eschenbach | H01M 8/04223 |
| 2019/0178448 | A1 | 6/2019 | Pelger et al. | |

OTHER PUBLICATIONS

German-language Written Opinion (PCT/ISA/237) issued in PCT Application No. PCT/EP2021/060171 dated Jul. 6, 2021 (six (6) pages).

German-language Search Report issued in German Application No. 10 2020 112 830.4 dated Feb. 10, 2021 with partial English translation (12 pages).

Cover page of EP 2 828 569 A2 published Jan. 28, 2015 (one (1) page).

* cited by examiner

CONTROL UNIT AND METHOD FOR OPERATING A PRESSURE VESSEL VALVE OF A PRESSURE VESSEL

BACKGROUND AND SUMMARY

The technology disclosed herein relates to a pressure-vessel system having one or more pressure vessels, for a motor vehicle for example. Moreover, the technology disclosed herein relates to a method and a corresponding control unit for the operation of a pressure-vessel valve of a pressure vessel of a pressure-vessel system of such a type.

A motor vehicle may exhibit a fuel cell which, on the basis of a fuel such as hydrogen for example, generates electrical energy for the operation—in particular, for the propulsion—of the vehicle. The fuel can be stored in at least one pressure vessel of the vehicle. The fuel can be conducted out of the pressure vessel via a fuel line to the fuel cell of the vehicle by opening a valve, in particular a so-called on-tank valve (OTV).

After the end of the operation of the fuel cell of the vehicle, typically it has to be ensured that the valve of the pressure vessel of the vehicle has been closed reliably, in order to avoid an inadvertent seepage of fuel out of the pressure vessel.

It is a preferred object of the technology disclosed herein to lessen or to eliminate at least one disadvantage of a previously known solution, or to propose an alternative solution. It is a preferred object of the technology disclosed herein to enable an efficient and reliable check of the imperviousness of a valve of a pressure vessel of a pressure-vessel system of a vehicle.

The object(s) is/are achieved by the subject-matter of the independent claims. The dependent claims represent preferred configurations.

According to one aspect, a control unit is described for a pressure-vessel system, in particular for a pressure-vessel system for a motor vehicle (for example, for a passenger car, for a motorcycle, for a utility vehicle, etc.). The pressure-vessel system typically serves for storing fuel that is gaseous under ambient conditions. The pressure-vessel system can be employed, for instance, in a motor vehicle that is operated with compressed natural gas (CNG) or with liquefied natural gas (LNG) or with hydrogen (in particular, $H_2$) as fuel. The pressure-vessel system is typically fluidically connected to at least one energy converter which has been configured to convert chemical energy of the fuel into one or more other forms of energy.

Such a pressure-vessel system includes at least one pressure vessel, in particular a composite overwrapped pressure vessel. The pressure vessel may be, for instance, a cryogenic pressure vessel or a high-pressure gas vessel.

High-pressure gas vessels are designed to store fuel permanently at a nominal operating pressure (also called nominal working pressure or NWP) of at least 350 bar gauge pressure (=overpressure in relation to atmospheric pressure) or at least 700 bar gauge pressure at ambient temperatures. A cryogenic pressure vessel is suitable to store the fuel at the aforementioned operating pressures also at temperatures that lie distinctly (for example, more than 50 Kelvins or more than 100 Kelvins) below the operating temperature of the motor vehicle.

The pressure-vessel system described in this document includes at least one pressure vessel with a pressure-vessel valve, the pressure-vessel valve being designed to direct (gaseous) fuel out of the pressure vessel into a withdrawal line for the purpose of supplying an energy converter. In this connection, between the withdrawal line and the energy converter a pressure-converter has typically been arranged which has been configured to convert fuel having a relatively high pressure (for example, 100 bar gauge pressure or more) from the withdrawal line into fuel having a relatively low pressure (for example, 2 bar gauge pressure or less).

The pressure-vessel valve may be a so-called on-tank valve (OTV). A combination of an electromagnetically actuated valve, a manually actuated valve and, where appropriate, a thermal pressure-relief device (TPRD) is typically designated as an on-tank valve (OTV). The electromagnetically actuated valve and the manually actuated valve may, in particular, have been interconnected in series, in which case one or both of them may in each instance constitute a tank shut-off valve.

The energy converter has been configured to convert chemical energy of the fuel into one or more other forms of energy, for instance into electrical energy and/or into kinetic energy. The energy converter may be, for instance, an internal-combustion engine or a fuel-cell system or a fuel-cell stack with at least one fuel cell.

The control unit has been configured to determine that a power-reduced mode of operation of the energy converter is present. In this connection, a power-reduced mode of operation may be a mode of operation in which the mass flow of fuel (through the pressure-vessel valve and/or through the withdrawal line) for the purpose of supplying the energy converter is less than or equal to a predefined mass-flow threshold value. The power-reduced mode of operation may differ from a power mode of operation in which the mass flow of fuel for the purpose of supplying the energy converter is greater than the mass-flow threshold value. The power mode of operation can be used, for example, for propelling a motor vehicle.

The pressure-vessel system may, for example, have been designed for a nominal mass flow (for the power mode of operation). The mass-flow threshold value may amount to 10% or less of the nominal mass flow.

In a preferred example, the fuel includes—in particular, is—hydrogen. Moreover, the energy converter comprises at least one fuel cell (in particular, a fuel-cell stack). Furthermore, the power-reduced mode of operation may include—in particular, may be—a frost conditioning of the fuel cell. During the frost conditioning, fuel can be used in order to purge the one or more fuel cells and in order thereby to remove residual water from the one or more fuel cells.

The control unit has furthermore been configured to induce the pressure-vessel valve to be opened intermittently and/or in pulse-type manner during the implementation of the power-reduced mode of operation, in order in each instance to direct a surge of fuel out of the pressure vessel into the withdrawal line. In other words, the pressure-vessel valve can only be opened temporarily (for a particular pulse duration in each instance) in order to direct fuel out of the pressure vessel into the withdrawal line temporarily or in pulse-type manner.

The intermittent operation of the pressure-vessel valve makes it possible to set the fuel pressure in the withdrawal line to a pressure value that lies below the fuel pressure within the pressure vessel, so that the imperviousness of the pressure-vessel valve can be checked in reliable manner, in particular on the basis of the temporal development of the fuel pressure in the withdrawal line (while the pressure-vessel valve is closed or should have been closed).

The control unit may consequently have been configured to ascertain (in particular, after conclusion of the power-reduced mode of operation) line sensor data with respect to the (fuel) pressure in the withdrawal line (for example, by means of a pressure sensor in the withdrawal line). The line sensor data can be captured, in particular, when the pressure-vessel valve should have been closed (for example, after conclusion of the power-reduced mode of operation). On the basis of the line sensor data (in particular, on the basis of the temporal development of the fuel pressure in the withdrawal line), it can then be determined in reliable manner whether or not the pressure-vessel valve is impervious.

Moreover, the control unit may have been configured to determine that a power mode of operation of the energy converter is present, in which connection the mass flow of fuel for the purpose of supplying the energy converter in the power mode of operation is greater than the predefined mass-flow threshold value. The pressure-vessel valve can then be induced to remain permanently open during the (entire) implementation of the power mode of operation, in order to direct fuel out of the pressure vessel into the withdrawal line.

By virtue of the permanent opening of the pressure-vessel valve, a reliable supply of fuel to the energy converter can be guaranteed. On the other hand, by virtue of the permanent opening of the pressure-vessel valve, the fuel pressure in the withdrawal line is typically caused to correspond to the internal pressure in the pressure vessel (so, after the pressure-vessel valve has been closed, the imperviousness of the pressure-vessel valve cannot usually be determined on the basis of the line sensor data with respect to the pressure in the withdrawal line).

The control unit may have been configured to open the pressure-vessel valve intermittently during the (entire) implementation of the power-reduced mode of operation in such a way that the pressure in the withdrawal line does not exceed a predefined upper limiting pressure value (during the entire implementation of the power-reduced mode of operation). The upper limiting pressure value is preferably less than the internal pressure in the pressure vessel (for example, by a particular offset value, approximately 10% or more, or by 50 bar to 60 bar, than the internal pressure in the pressure vessel). Alternatively or additionally, the control unit may have been configured to open the pressure-vessel valve intermittently during the (entire) implementation of the power-reduced mode of operation in such a way that the pressure in the withdrawal line is always lower than the internal pressure in the pressure vessel by at least the predefined offset value. By virtue of such an operation of the pressure-vessel valve, a particularly reliable check of the imperviousness of the pressure-vessel valve (during the power-reduced mode of operation and/or immediately following the power-reduced mode of operation) can be made possible.

The control unit may have been configured to ascertain (where appropriate repeatedly, in particular periodically) line sensor data with respect to the pressure in the withdrawal line during the implementation of the power-reduced mode of operation. The line sensor data can be ascertained, in particular, when the pressure-vessel valve has been closed or should have been closed. The pressure-vessel valve can then be opened intermittently in reliable manner as a function of the line sensor data. In particular, the control unit may have been configured to detect, on the basis of the line sensor data, that the pressure in the withdrawal line is reaching or falling below a lower limiting pressure value (for example, 100 bar gauge pressure). In response thereto, an energy pulse can then be brought about, in order to open the pressure-vessel valve intermittently (for a particular, limited pulse duration). In this way, even in the case of an intermittent operation of the pressure-vessel valve a reliable supply of fuel to the energy converter can be brought about.

The control unit may have been configured to ascertain (where appropriate repeatedly, in particular periodically) state data with respect to the present state of the pressure-vessel system in each instance. The state data may comprise, for example, information (in particular, line sensor data) with respect to the present pressure in the withdrawal line. Alternatively or additionally, the state data may include information (in particular, sensor data) with respect to the present pressure in the pressure vessel. Alternatively or additionally, the state data may include information (in particular, sensor data) with respect to the present temperature of the fuel.

The control unit may furthermore have been configured to bring about an energy pulse depending on the state data, in order to open the pressure-vessel valve intermittently. In particular, one or more parameters of the energy pulse can be set as a function of the state data. The one or more parameters may comprise: the current intensity of the current (in particular, of the current pulse) brought about for the purpose of opening the pressure-vessel valve; the voltage value of the voltage (in particular, of the voltage pulse) brought about for the purpose of opening the pressure-vessel valve; the duration of the energy pulse; and/or the electrical power and/or the electrical energy of the energy pulse.

The energy pulse may be brought about, for example, on an electromagnet of the pressure-vessel valve, in order to generate a pulse-type magnetic field by which the pressure-vessel valve is opened in pulse-type manner. The power and/or the energy of the energy pulse can consequently be adapted to the present state of the pressure-vessel system (in particular, to the present pressure in the withdrawal line, to the present pressure in the pressure vessel, and/or to the differential pressure of the two pressures). In this way, the pressure in the withdrawal line can be set in particularly precise manner (in order to enable a reliable check of the imperviousness of the pressure-vessel valve).

The control unit may have been configured to bring about the energy pulse as a function of the state data, in order to set the pressure in the withdrawal line to a predefined upper limiting pressure value, and/or in order to bring about an increase in pressure in the withdrawal line by a predefined amount of differential pressure. The energy pulse can consequently also be adapted as a function of the pressure to be brought about in the withdrawal line and/or as a function of the increase in pressure to be brought about. In this way, the quality of the setting of the pressure in the withdrawal line, and consequently the reliability of the check of the imperviousness of the pressure-vessel valve, can be enhanced further.

The control unit may have been configured to bring about the energy pulse as a function of predefined characteristic data for the pressure-vessel system. The characteristic data may have been stored in a memory unit of the pressure-vessel system. Furthermore, the characteristic data may have been ascertained experimentally in advance.

The characteristic data may indicate, in each instance, parameter values for one or more parameters of the energy pulse for a plurality of different possible state data (that is to say, for a plurality of different possible states of the pressure-vessel system). The characteristic data may have been ascertained in order to bring about in each instance, starting from a present state of the pressure-vessel system indicated by state data, an increase in pressure in the withdrawal line by the predefined amount of differential pressure and/or to the predefined upper limiting pressure value. By the characteristic data, ascertained in advance, for the pressure-vessel system being taken into account, the quality of the setting of the pressure in the withdrawal line and consequently the reliability of the check of the imperviousness of the pressure-vessel valve can be enhanced further.

The pressure-vessel valve may exhibit a pilot seat and a main seat. In this connection, the mass flow of fuel out of the pressure vessel may be less (for example, less by a factor of two or more) when the pilot seat of the pressure-vessel valve is open than when the main seat of the pressure-vessel valve is open. On the other hand, the opening of the pilot seat may possibly cause slighter wear of the pressure-vessel valve than the opening of the main seat.

The control unit may have been configured to open the pressure-vessel valve intermittently in such a way that during the (entire) implementation of the power-reduced mode of operation the main seat is not opened or the main seat is never opened at least temporarily, and/or only the pilot seat is opened at least temporarily or exclusively. In this way, an intermittent operation of the pressure-vessel valve for the purpose of checking the imperviousness of the valve can be made possible in efficient and reliable manner.

The pressure-vessel system may include a first pressure-vessel valve (for example, for a first pressure vessel of the pressure-vessel system) and a second pressure-vessel valve (for example, for a second pressure vessel of the pressure-vessel system).

The control unit may have been configured to open intermittently the first pressure-vessel valve at least temporarily and the second pressure-vessel valve at least temporarily, in particular to open intermittently the first pressure-vessel valve and the second pressure-vessel valve alternately, during the implementation of the power-reduced mode of operation of the energy converter and/or during a plurality of successive implementations of the power-reduced mode of operation. By virtue of an alternating operation of different pressure-vessel valves, the stressing of the pressure-vessel valves can be reduced by reason of the intermittent operation, which in turn enables a reliable check of the imperviousness of the pressure-vessel valves.

The control unit may have been configured to ascertain mass-flow information with respect to the mass flow of fuel into the energy converter. The mass-flow information can be provided by the energy converter. In particular, the energy converter may exhibit a valve on the input side which sets—in particular, regulates—the input mass flow into the energy converter. This valve may comprise, for example, a proportional valve or one or more injectors. A signal provided by the valve may then be representative of the input mass flow into the energy converter (and can consequently be provided as mass-flow information).

The device may furthermore have been configured to bring about the intermittent opening of the pressure-vessel valve as a function of the mass-flow information during the implementation of the power-reduced mode of operation. This may occur, in particular, in such a way that a mass flow of fuel out of the pressure vessel, provided by opening the pressure-vessel valve, corresponds, at least on average over time, to the mass flow of fuel into the energy converter. In other words, the pressure-vessel valve can be pulsed in such a way that the output mass flow out of the pressure vessel is equal to the input mass flow of the energy converter. In this way, a particularly reliable power-reduced mode of operation of the energy converter can be made possible.

According to a further aspect, a pressure-vessel system is described, in particular for a motor vehicle. The pressure-vessel system includes at least one pressure vessel with a pressure-vessel valve which is designed to direct fuel out of the pressure vessel into a withdrawal line for the purpose of supplying an energy converter. Moreover, the pressure-vessel system includes the control unit described in this document, which has been configured to trigger the pressure-vessel valve (for an intermittent mode).

According to a further aspect, a motorized (road) vehicle (in particular, a passenger car or a truck or a bus) is described that includes the pressure-vessel system described in this document.

According to a further aspect, a method is described for operating a pressure-vessel valve of a pressure vessel, the pressure-vessel valve being designed to direct fuel out of the pressure vessel into a withdrawal line for the purpose of supplying an energy converter.

The method includes determining that a power-reduced mode of operation of the energy converter is present. In this connection, in a power-reduced mode of operation the mass flow of fuel (through the pressure-vessel valve or through the withdrawal line) for the purpose of supplying the energy converter may be less than or equal to a predefined mass-flow threshold value. The method further includes causing the pressure-vessel valve to be opened intermittently during the (entire) implementation of the power-reduced mode of operation, in order in each instance to direct a surge of fuel out of the pressure vessel into the withdrawal line (and in order in the process to bring about in each instance a fuel pressure in the withdrawal line that is less than the fuel pressure in the pressure vessel).

According to a further aspect, a software (SW) program is described. The SW program may have been configured to be executed in a processor (for example, in a control unit of a vehicle) and thereby to execute the method described in this document.

According to a further aspect, a storage medium is described. The storage medium may include a SW program that has been configured to be executed in a processor and thereby to execute the method described in this document.

It should be noted that the methods, devices and systems described in this document can be used both on their own and in combination with other methods, devices and systems described in this document. Moreover, any aspects of the methods, devices and systems described in this document can be combined with one another in diverse ways. In particular, the features of the claims can be combined with one another in diverse ways.

In the following, the invention will be described in more detail with reference to exemplary embodiments.

DETAILED DESCRIPTION OF THE DRAWINGS

As stated at the outset, the present document is concerned with the technical task of enabling a reliable check of the imperviousness of a pressure-vessel valve, in particular at the end of the operation of an energy converter—in particular, a fuel cell—of a vehicle.

Figure 1:
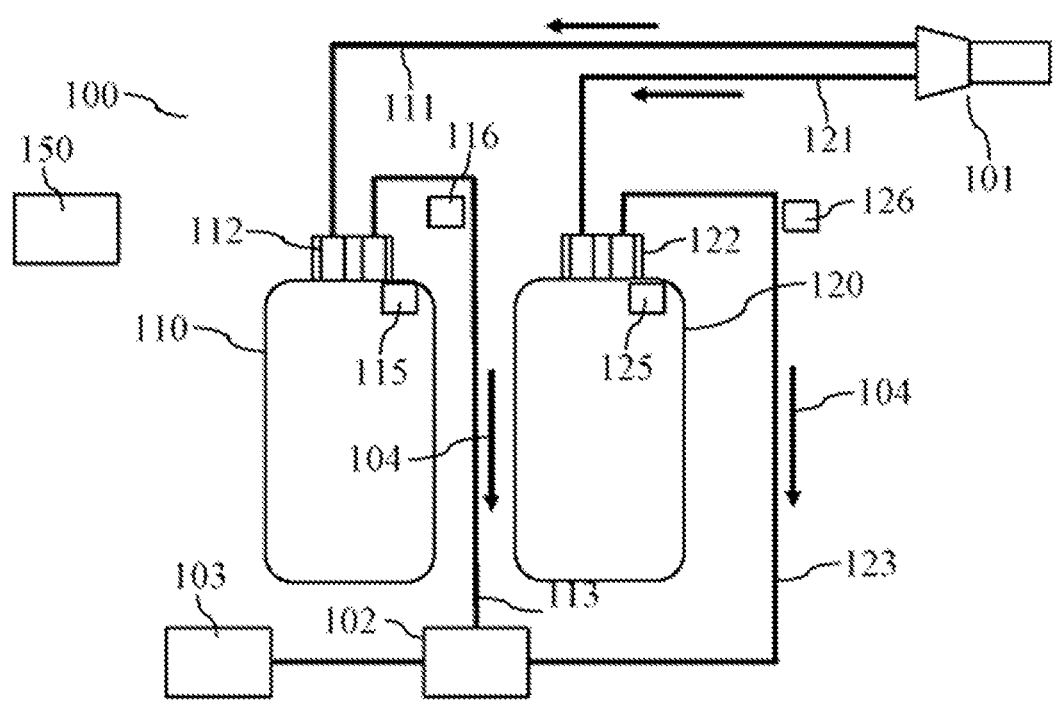
FIG. 1 shows an exemplary pressure-vessel system having several pressure vessels.

In this context, FIG. 1 shows an exemplary pressure-vessel system 100 with a first pressure vessel 110 and with a second pressure vessel 120. The pressure vessels 110, 120 respectively exhibit valve devices 112, 122 via which the inflow and the outflow of fuel 104 to and out of the pressure vessels 110, 120 can be controlled.

The pressure-vessel system 100 represented in FIG. 1 includes supply lines 111, 121 which are designed to conduct fuel 104 from a refueling portal 101 to the pressure vessels 110, 120. A first supply line 111 is routed to an inlet of the first valve device 112 of the first pressure vessel 110. In corresponding manner, a second supply line 121 is routed to an inlet of the second valve device 122 of the second pressure vessel 120. In this way, the two pressure vessels 110, 120 can be refueled from one refueling portal 101.

The pressure-vessel system 100 further includes a first withdrawal line 113, which is connected to an outlet of the first valve device 112, and also a second withdrawal line 123 which is connected to an outlet of the second valve device 122. Via the withdrawal lines 113, 123, fuel 104 can be conducted out of the pressure vessels 110, 120 to a pressure-converter 102. Typically, the pressure in the pressure vessels 110, 120 is higher than the operating pressure of an energy converter 103 (for example, a fuel cell or a fuel-cell stack). The operating pressure of an energy converter 103 may, for example, lie within the range from 10 bar to 20 bar. The pressure in a pressure vessel 110, 120 may be higher than the operating pressure of an energy converter 103, for instance by a factor of 2, 5, 10, 20 or more. The pressure-converter 102 (in particular, a pressure regulator) may have been configured to convert the pressure of the fuel 104 from the pressure vessels 110, 120 into the requisite operating pressure of the energy converter 103.

Figure 2:
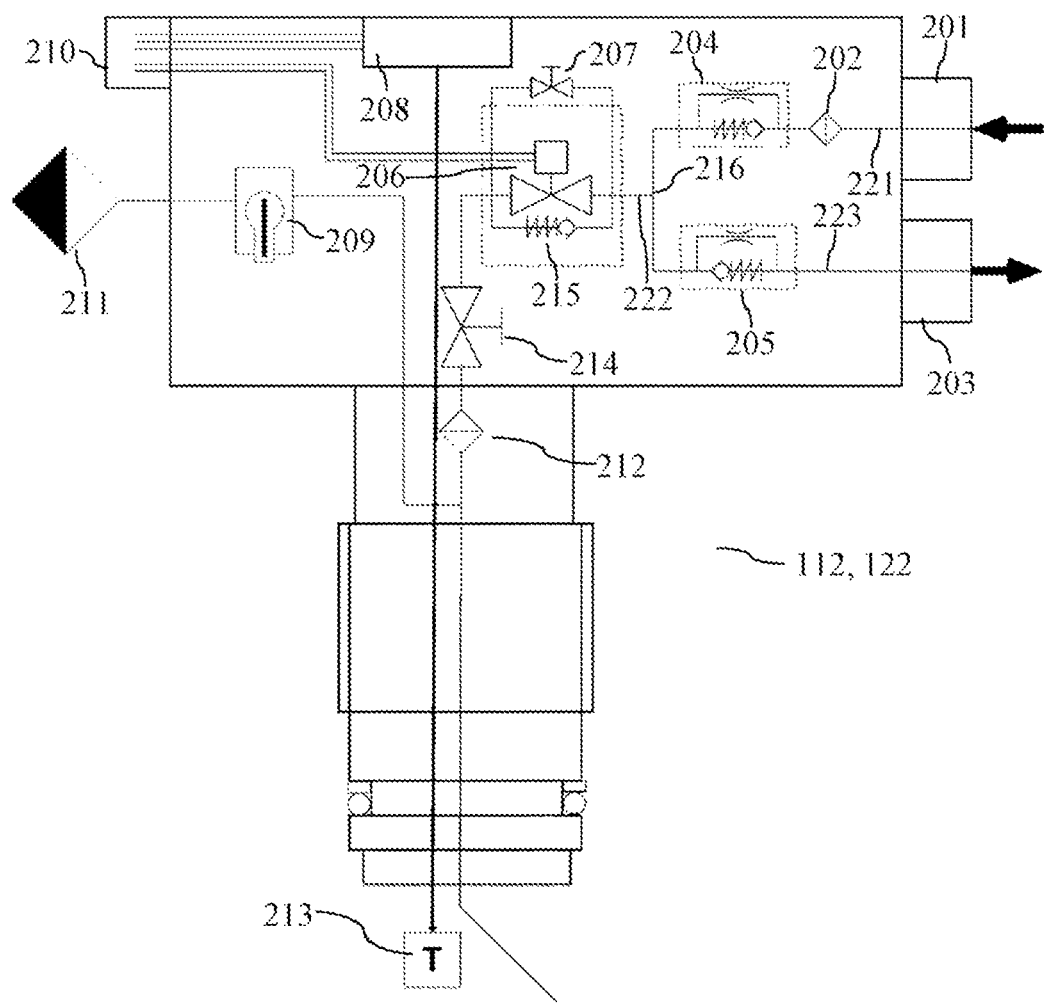
FIG. 2 shows an exemplary valve device for a pressure vessel.

FIG. 2 shows an exemplary valve device 112, 122 for a pressure vessel 110, 120. The valve device 112, 122 includes an inflow interface 201, for coupling a supply line 111, 121, and an outflow interface 203 for coupling a withdrawal line 113, 123. The fuel 104 supplied via the inflow interface 201 can be filtered in an inflow filter 202, in order to avoid or to reduce a contamination of the pressure vessel 110, 120 and/or of a seal seat of the valve device 112, 122.

The inflow duct 221, including the inflow interface 201, for supplying fuel 104, and the outflow duct 223, including the outflow interface 203, for conducting fuel 104 away can be coupled with one another and with a common duct 222 at a coupling-point 216. The common duct 222 can connect the coupling-point 216 to the interior space of a pressure vessel 110, 120.

The common duct 222 may exhibit an electrically operable valve 206. The electrically operable valve 206 may have been connected in electrically conducting manner to a data interface 210 of the valve device 112, 122 via a data bus. Via the data interface 210, a control signal can be received that indicates whether the electrically operable (pressure-vessel) valve 206 is to be opened or closed. The electrically operable valve 206 may comprise an electromagnetic valve, for example. The control signal can be provided by a control unit 150 of the pressure-vessel system 100.

A check valve 215 may have been arranged parallel to the electrically operable valve 206. The check valve 215 may have been arranged in such a way that a seepage of fuel 104 out of the pressure vessel 110, 120 is avoided, but that the supply of fuel 104 into the pressure vessel 110, 120 (for example, in the course of a refueling process) is made possible by overcoming the restoring force of the check valve 215. Moreover, the electrically operable valve 206 can, where appropriate, be bridged by a manual valve 207. The manual valve 207 can be opened manually, by maintenance personnel for example, in order to defuel the pressure vessel 110, 120 at least partially. The inflow duct 221 and the outflow duct 223 can consequently extend jointly from the coupling-point 216 via the common duct 222 into the interior space of the pressure vessel 110, 120. The common duct 222 can be routed via a further manual valve 214 which can be utilized for the purpose of closing or opening a pressure vessel 110, 120 manually. Moreover, the common duct 222 can be routed via a further outflow filter 212 with which the fuel 104 can be filtered before being supplied to the energy converter 103.

The valve device 112, 122 may further include a temperature sensor 213 with an evaluating unit 208 which is connected to the data interface 210. In this way, sensor data relating to the temperature of the pressure vessel 110, 120 and/or of the stored fuel 104 can be provided. In addition, the valve device 112, 122 may include a pressure-relief unit 209 (for example, a thermal pressure-relief device, TPRD) which is designed to open the pressure vessel 110, 120 when a temperature threshold value is reached or exceeded, in order to let out fuel 104 via a venting unit (in particular, an aperture) 211, and in order thereby to reduce the pressure in the interior space of the pressure vessel 110, 120.

The outflow duct 223 may exhibit between the coupling-point 216, at which the outflow duct 223 and the inflow duct 221 are brought together, and the outflow interface 203 a flow-limiting unit 205 which has been configured to limit and, where appropriate, to inhibit the rearward flow of fuel 104 from the outflow interface 203 to the coupling-point 216. The flow-limiting unit 205 may exhibit a check valve which has been configured to inhibit a rearward flow entirely. Alternatively or additionally, the flow-limiting unit 205 may exhibit (for example, parallel to the check valve) a throttle which has been configured to limit the rearward flow to a particular maximum value (for example, to a maximum value of the mass flow and/or of the volume flow). In corresponding manner, a flow-limiting unit 204 can also be arranged on the inflow duct 221 between the inflow interface 201 and the coupling-point 216, the flow-limiting unit limiting (for example, by means of a throttle) the rearward flow of fuel 104 out of the pressure vessel 110, 120 to a particular maximum value, and/or blocking it (for example, by means of a check valve). In this way, flows of fuel for an equalization of pressure via the supply lines 111, 121 (for example, at the beginning of a refueling operation) can be limited.

During a pause in the operation of the pressure-vessel system 100, in particular of the energy converter 103, it frequently has to be ensured that the pressure-vessel valves 206 of the one or more pressure vessels 110, 120 of the pressure-vessel system 100 have been closed reliably, in order to prevent an inadvertent seepage of fuel 104 out of the one or more pressure vessels 110, 120. For this purpose, the pressure-vessel system 100 may include, in the one or more pressure vessels 110, 120, a pressure-vessel pressure sensor 115, 125, respectively, which has been configured to capture internal-pressure sensor data with respect to the internal pressure of the respective pressure vessel 110, 120. Moreover, the pressure-vessel system 100 may include, in the one or more withdrawal lines 113, 123, a line pressure sensor 116, 126, respectively, which has been configured to capture line sensor data with respect to the pressure of the fuel 104 in the respective withdrawal line 113, 123.

Where appropriate, an estimate with respect to the internal pressure in a pressure vessel 110, 120 can be ascertained on the basis of the line sensor data. In particular, in a situation in which the pressure-vessel valve 206 of a pressure vessel 110, 120 is open and in which there is no mass flow of fuel in the withdrawal line 113, 123, it can be inferred that the internal pressure in the pressure vessel 110, 120 corresponds to the pressure in the withdrawal line 113, 123. This pressure value can then be used by way of internal pressure of the pressure vessel 110, 120 (where appropriate, corrected for any changes in temperature).

The control unit 150 of the pressure-vessel system 100 may have been configured to check, on the basis of the line sensor data for a withdrawal line 113, 123 and/or on the basis of the pressure-vessel sensor data of the corresponding pressure vessel 110, 120, whether or not the pressure-vessel valve 206 of the pressure vessel 110, 120 is exhibiting a leak. In particular, on the basis of the difference in pressure (in particular, on the basis of the temporal progression of the difference in pressure) between the line pressure in the withdrawal line 113, 123 and the internal pressure in the pressure vessel 110, 120 it can be detected whether or not a leak is present. For instance, by virtue of a rise in the line pressure in the withdrawal line 113, 123 over time, an escape of fuel 104 from the pressure vessel 110, 120 can be detected.

In the case of permanent opening of the pressure-vessel valve 206 of a pressure vessel 110, 120, the pressure in the withdrawal line 113, 123 typically rises relatively quickly by reason of the relatively small volume of the withdrawal line 113, 123. This has the result that the line pressure in the withdrawal line 113, 123 usually corresponds to the internal pressure in the pressure vessel 110, 120, and that consequently the imperviousness of the pressure-vessel valve 206 cannot be detected on the basis of the difference in pressure between the line pressure in the withdrawal line 113, 123 and the internal pressure in the pressure vessel 110, 120.

The pressure-vessel system 100, in particular the energy converter 103, may exhibit one or more modes of operation in which only a relatively small volume flow of fuel 104 out of the one or more pressure vessels 110, 120 is needed. A mode of operation of such a type is also designated in this document as a power-reduced mode of operation. An exemplary mode of operation with a reduced fuel demand is the frost conditioning of the energy converter 103, in the course of which fuel 104 is blown through the energy converter 103 in order to drive water out of the energy converter 103 in preparation for a deactivation of the energy converter 103.

In the course of the frost conditioning, the energy converter 103 (in particular, the fuel cell or the fuel-cell stack) requires a relatively small quantity of fuel 104 (in particular, of $H_2$), which, however, is typically greater than the quantity of fuel that is already available in the high-pressure and/or medium-pressure lines 113, 123. For the frost conditioning, consequently it is typically necessary to deliver fuel 104 from at least one pressure vessel 110, 120 to the energy converter 103. For this purpose, the pressure-vessel valves 206 of the one or more pressure vessels 110, 120 can be kept open during the frost conditioning and/or until the frost conditioning has been concluded. However, this has the result that the line pressure in the withdrawal line 113, 123 of a pressure vessel 110, 120 corresponds to the internal pressure of the pressure vessel 110, 120 after the frost conditioning has been concluded, so on the basis of the sensor data of the pressure sensors 115, 125, 116, 126 it cannot be detected reliably whether or not the pressure-vessel valve 206 is impervious.

The control unit 150 may have been configured to operate the pressure-vessel valve 206 of a pressure vessel 110, 120 intermittently, or in pulsed manner, in order to direct fuel 104 out of the pressure vessel 110, 120 into the withdrawal line 113, 123 in surges. By virtue of a pulsed operation, the line pressure in the withdrawal line 113, 123 can be caused to be lower than the internal pressure in the pressure vessel 110, 120 after the pressure-vessel valve 206 has been closed. As a result of this, on the basis of the line sensor data of the pressure sensor 116, 126 on the withdrawal line 113, 123 it can be checked reliably whether or not the pressure-vessel valve 206 is impervious.

Figure 3:
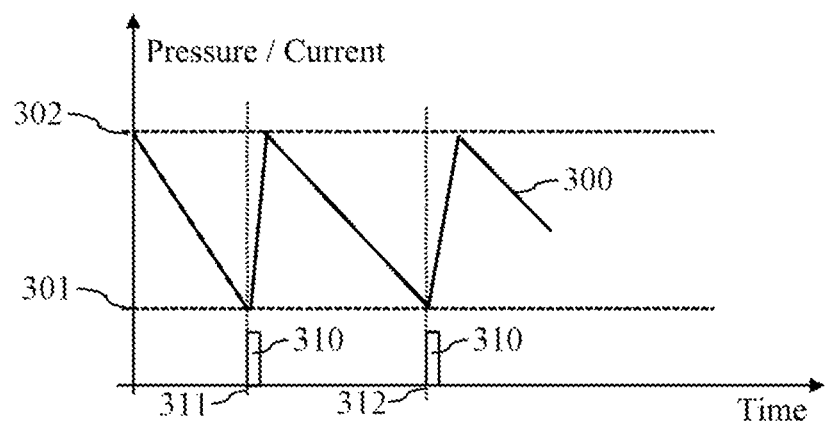
FIG. 3 shows an exemplary temporal progression of the pressure in a fuel-withdrawal line of the pressure-vessel system.

FIG. 3 shows an exemplary temporal progression 300 of the line pressure in the withdrawal line 113, 123. The control unit 150 may have been configured to monitor the line pressure on the basis of the line sensor data. If the line pressure reaches or falls below a lower limiting pressure value 301 (for example, 100 bar gauge pressure), a triggering pulse—or, to be more exact—an energy pulse 310 for triggering the pressure-vessel valve 206 (in particular, the electromagnet of the valve 206) can be brought about, in order to open the pressure-vessel valve 206 in pulse-type manner. The triggering with the energy pulse 310 occurs at a pulse time 311, 312. As represented by way of example in FIG. 3, the energy pulse 310 may have a particular current intensity.

As a consequence of the pulse-type opening of the pressure-vessel valve 206, the line pressure rises (for example, as far as an upper limiting pressure value 302, for instance 200 bar gauge pressure). Immediately following this, the line pressure drops again by reason of the fuel consumption of the energy converter 103, and an energy pulse 310 can be brought about once again when the lower limiting pressure value 301 is reached, in order to direct fuel 104 into the withdrawal line 113, 123 and in order therefore to increase the line pressure again.

The pressure-vessel valve 206 can consequently be operated in pulse-type manner in such a way that the line pressure in the withdrawal line 113, 123 at any time lies between a lower limiting pressure value 301 and an upper limiting pressure value 302, the upper limiting pressure value 302 being less than the internal pressure in the pressure vessel 110, 120. A regulation of the line pressure in the withdrawal line 113, 123 can consequently be brought about, one or more parameters of the energy pulse 310 (for example, the pulse duration and/or the pulse energy) being control variables of the control loop. By virtue of the setting of the line pressure to a particular pressure interval, it can be ensured that after conclusion of the operation of the pressure-vessel valve 206 the line pressure is less than the internal pressure of the pressure vessel 110, 120, so that the imperviousness of the pressure-vessel valve 206 can be checked or monitored reliably. As already stated above, the volume of the withdrawal line 113, 123 is typically relatively small, so even a relatively short opening pulse of the pressure-vessel valve 206 can result in a significant rise in the line pressure in the withdrawal line 113, 123. As a consequence of this, it may not be possible to adapt the energy pulse 310 (where appropriate, solely) as a function of the line sensor data in order to limit the line pressure to the upper limiting pressure value 302. In particular, typically no regulation of the line pressure can be undertaken (solely) on the basis of the line sensor data.

Figure 4:
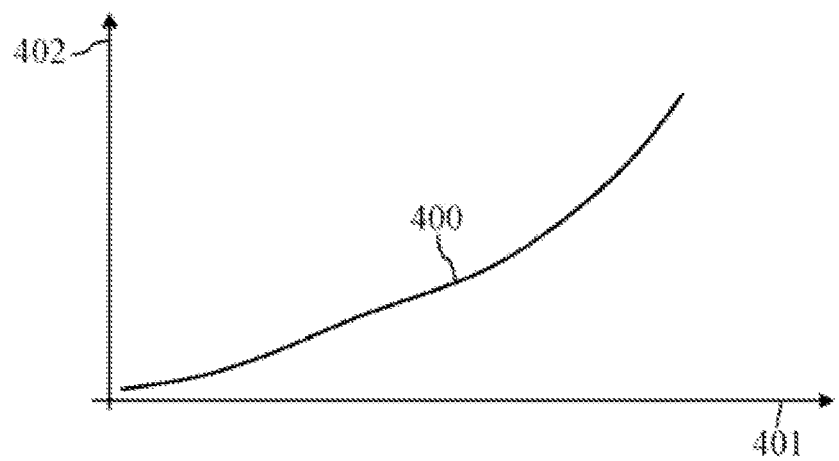
FIG. 4 shows exemplary characteristic data for triggering a pressure-vessel valve.

FIG. 4 shows exemplary characteristic data 400, in particular a characteristic curve, which can be used to adapt the energy pulse 310 for triggering the pressure-vessel valve 206 to the respective situation, in order to cause the line pressure to be limited to the upper limiting pressure value 302. The characteristic data 400 can be ascertained experimentally in advance and stored in a memory unit (not represented) of the pressure-vessel system 100, in particular in the control unit 150.

The characteristic data 400 may indicate parameters 402 of the energy pulse 310 for triggering the pressure-vessel valve 206, in particular parameters 402 with respect to the energy of the energy pulse 310, as a function of state data 401 with respect to the state of the pressure-vessel system 100.

Exemplary parameters 402 in this connection are:
the current intensity of the energy pulse 310;
the voltage of the energy pulse 310;
the temporal duration of the energy pulse 310;
the electrical power of the energy pulse 310; and/or
the cumulative electrical energy of the energy pulse 310.
Exemplary state data 401 are:
the (present) internal pressure of the pressure vessel 110, 120;
the temperature of the fuel 104 in the pressure vessel 110, 120;
the (present) line pressure in the withdrawal line 110, 120; and/or
the (present) difference in pressure between the internal pressure and the line pressure.

The characteristic data 400 can be ascertained in such a way that, starting from the present state of the pressure-vessel system 100, a particular, predefined rise in pressure in the withdrawal line 113, 123 is brought about by the energy pulse 310 generated in accordance with the ascertained parameters 402—for example, a rise in pressure from the lower limiting pressure value 301 to the upper limiting pressure value 302.

The control unit 150 may have been configured to ascertain state data 401 with respect to the present state of the pressure-vessel system 100 at a pulse time 311, 312. On the basis of the characteristic data 400, parameters 402 for the energy pulse 310 to be brought about can then be ascertained. The energy pulse 310 can then be generated in accordance with the ascertained parameters 402, for example in order to cause the pressure-vessel valve 206 to be opened so far and/or for so long that the line pressure in the withdrawal line 113, 123 is increased (as far as possible, exactly) to the upper limiting pressure value 302.

In other words, the pressure-vessel valve 206 of a pressure vessel 110, 120 can be operated in such a way that the pressure-vessel valve 206 is opened only temporarily or in pulsed manner. For instance, the pressure-vessel valve 206 can be energized for a relatively short time of 20 ms, for example, and thereafter the energization can be interrupted. Within the energization time-interval, the valve seat opens briefly, and a surge of fuel 104 flows into the line 113, 123. The pressure in the high-pressure line 113, 123 rises but does not become as high as the internal pressure in the pressure vessel 110, 120.

By virtue of this manner of operation, the pressure in the high-pressure line 113, 123 can be set—in particular, regulated-within a pressure window between a lower limiting pressure value 301 (for example, 100 bar) and an upper limiting pressure value 302 (for example, 200 bar). As a result, it is possible to carry out the diagnosis of the closing of the pressure-vessel valve 206 at any time. A further advantage by virtue of the reduced pressure in the high-pressure line 113, 123 is that there is also less fuel mass therein, so less fuel 104 is released into the environment in a fault scenario during the frost-conditioning process with subsequent leakage.

The pulsed operation of the pressure-vessel valve 206 permits the provision of relatively small mass flows of fuel such as is the case, for example, during frost conditioning. But the measures described in this document are generally applicable to modes of operation of the pressure-vessel system 100 that exhibit a reduced mass flow of fuel (in comparison with normal operation).

As already stated above, the surge flowing into the line 113, 123 is dependent on the internal pressure in the pressure vessel 110, 120 and on the line pressure in the line 113, 123. Table 1 shows, by way of example, the increases in pressure in the withdrawal line 113, 123 brought about for differing opening-periods of the pressure-vessel valve 206 and/or for differing internal pressures of the pressure vessel 110, 120.

TABLE 1

| Internal Pressure | Opening-Time | Increase in Pressure |
|---|---|---|
| 700 bar | 50 ms | 158 bar |
| 700 bar | 30 ms | 70 bar |
| 700 bar | 20 ms | 12 bar |
| 700 bar | 10 ms | 0 bar |
| 500 bar | 50 ms | 340 bar |
| 500 bar | 30 ms | 330 bar |
| 500 bar | 20 ms | 30 bar |
| 500 bar | 10 ms | 0 bar |

It is evident from Table 1 that at lower internal pressure and with an equally long pulse the surge quantity of fuel 104 out of the pressure vessel 110, 120 is greater. This is due to the fact that the magnet of the pressure-vessel valve 206 has to open the pressure-vessel valve 206 against the internal pressure of the pressure vessel 110, 120. At a lower internal pressure, a smaller magnetic force already suffices to overcome the counteracting force due to the internal pressure. In other words, the valve 206 is open for longer at an internal pressure of 500 bar than at an internal pressure of 700 bar. From Table 1 it is also evident that in the case of a pulse duration of 10 ms no opening of the valve 206 occurs, due to the inertia of the valve 206.

On the basis of measurements of such a type, a characteristic diagram 400 for the increase in pressure brought about by an energy pulse 310 can be drawn up as a function of the internal pressure of the pressure vessel 110, 120, and/or of the line pressure of the withdrawal line 113, 123. This characteristic diagram 400 can be saved in the control unit 150 of the pressure-vessel system 100 and used for the regulation of the line pressure, for example within the range between the lower limiting pressure value 301 and the upper limiting pressure value 302.

In order to reduce the number of opening cycles of a pressure-vessel valve 206, in the case of a pressure-vessel system 100 having several pressure vessels 110, 120 the pressure-vessel valve 206 of the first pressure vessel 110 and the pressure-vessel valve 206 of the second pressure vessel 120 can be opened alternately. Alternatively, the pressure-vessel valve 206 of the first pressure vessel 110 and the pressure-vessel valve 206 of the second pressure vessel 120 can be used alternately in the course of differing operational processes (for example, in the course of differing frost-conditioning processes).

The pressure-vessel valve 206 may be of multistage design. In particular, the pressure-vessel valve 206 may exhibit a pilot seat (with a relatively small cross-sectional area) and a main seat (with a relatively large cross-sectional area). The pressure-vessel valve 206 can be triggered in such a way (for example, by use of a relatively low current-level) that only the pilot seat, but not the main seat, is opened as a consequence of the energy pulse 310. The pressure-vessel valve 206 may have been designed in such a way that, by virtue of the exclusive opening of the pilot seat, reduced wear (or no wear at all) of the pressure-vessel valve 206 is brought about. In particular, the pressure-vessel valve 206 may have been designed to be permanently fixed with respect to the pilot seat, so that the number of opening/closing cycles is not limited. In this way, a particularly reliable operation of the pressure-vessel valve 206 can be made possible. Furthermore, by reason of the relatively small mass flow through the pressure-vessel valve 206 in the case of exclusive opening of the pilot seat the window between the lower limiting pressure value 301 and the upper limiting pressure value 302 can be kept relatively small.

Figure 5:
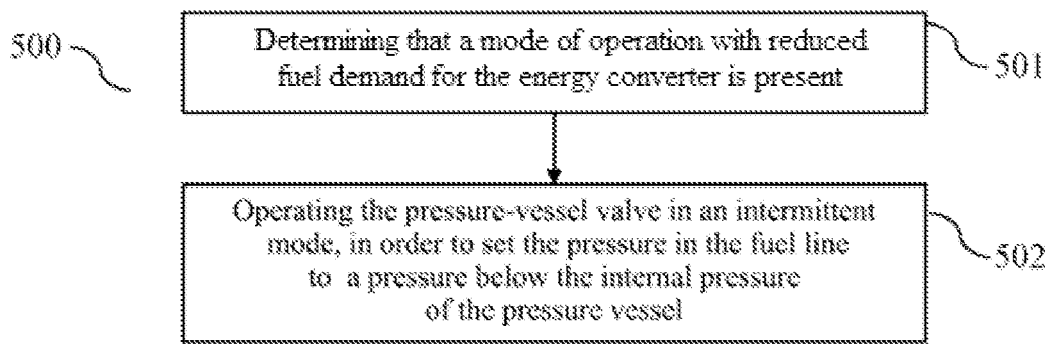
FIG. 5 shows a flowchart of an exemplary method for operating a pressure-vessel valve.

FIG. 5 shows a flowchart of a (where appropriate, computer-implemented) method 500 for operating a pressure-vessel valve 206 of a pressure vessel 110, 120. In this case, the pressure-vessel valve 206 is designed to direct fuel 104 (in particular, $H_2$) out of the pressure vessel 110, 120 into a withdrawal line 113, 123 for the purpose of supplying an energy converter 103 (in particular, a fuel cell).

The method 500 includes determining 501 that a power-reduced mode of operation of the energy converter 103 is present. In this connection, a power-reduced mode of operation may be present if the mass flow of fuel for the purpose of supplying the energy converter 103 (where appropriate, at any time during the implementation of the power-reduced mode of operation) is less than or equal to a predefined mass-flow threshold value. The pressure-vessel system 100 may, for example, have been designed for a nominal mass flow (if the pressure-vessel valve 206 remains permanently open). The mass-flow threshold value may amount to, for example, 50% or less, or 30% or less, or 10% or less, of the nominal mass flow. An exemplary power-reduced mode of operation is the frost conditioning of the energy converter 103.

The method 500 further includes causing 502 the pressure-vessel valve 206 to be opened intermittently (that is to say, pulse-wise) during the (entire) implementation of the power-reduced mode of operation, in order in each instance to direct a surge of fuel 104 out of the pressure vessel 110, 120 into the withdrawal line 113, 123. In this connection, the intermittent opening of the pressure-vessel valve 206 may occur in such a way that the fuel pressure in the withdrawal line 113, 123 always lies below the fuel pressure in the pressure vessel 110, 120 by at least a predefined offset value (of, for example, 10% or more). By virtue of the intermittent operation of the pressure-vessel valve 206, in this way a reliable check of the imperviousness of the pressure-vessel valve 206 during and/or after conclusion of the power-reduced mode of operation can be made possible (on the basis of the temporal development of the fuel pressure in the withdrawal line 113, 123).

The present invention is not restricted to the exemplary embodiments shown. In particular, it is to be noted that the description and the Figures are only intended to illustrate the principle of the proposed methods, devices and systems.

LIST OF REFERENCE SYMBOLS 100 pressure-vessel system
101 refueling portal
102 pressure-converter
103 energy converter
104 fuel
110, 120 pressure vessel
111, 121 supply line
112, 122 valve device
113, 123 withdrawal line
115, 125 pressure sensor (pressure vessel)
116, 126 pressure sensor (withdrawal line)
150 control unit
201 inflow interface
202 inflow filter
203 outflow interface
204, 205 flow-limiting unit
206 electrically operable valve
207 manual valve (parallel with the electrically operable valve)
208 evaluating unit
209 pressure-relief unit
210 data interface
211 venting unit
212 outflow filter
213 temperature sensor
214 manual valve (in series with the electrically operable valve)
215 check valve (parallel with the electrically operable valve)
216 coupling-point
221 inflow duct
222 common duct
223 outflow duct
301, 302 limiting pressure value
300 temporal pressure progression
310 energy pulse (for triggering a pressure-vessel valve)
311, 312 pulse times
400 characteristic data (in particular, characteristic curve)
401 state data
402 parameter of an energy pulse
500 method for operating a pressure-vessel valve
501, 502 method steps

The invention claimed is:

1. A control unit for a pressure-vessel system which includes at least one pressure vessel with a pressure-vessel valve designed to supply fuel from the pressure vessel into a withdrawal line that supplies an energy converter, comprising:
the control unit, wherein the control unit is operatively configured to:
determine that a power-reduced mode of operation of the energy converter is present, wherein a mass flow of fuel supplying the energy converter in the power-reduced mode of operation is less than or equal to a predefined mass-flow threshold value;
induce the pressure-vessel valve to be opened intermittently during implementation of the power-reduced mode of operation, in order in each instance to direct a surge of fuel out of the pressure vessel into the withdrawal line, such that:
(i) a pressure in the withdrawal line does not exceed a predefined upper limiting pressure value; wherein the upper limiting pressure value is less than an internal pressure in the pressure vessel; and/or
(ii) the pressure in the withdrawal line is always lower than the internal pressure in the pressure vessel by at least a predefined offset value;
ascertain, after conclusion of the power-reduced mode of operation, line sensor data with respect to a development over time of the pressure in the withdrawal line, wherein the pressure-vessel valve is closed after conclusion of the power-reduced mode of operation;
    detect, on the basis of the line sensor data, a rise in the pressure in the withdrawal line over time; and
    based thereon, determine that the pressure-vessel valve is leaking.

2. The control unit according to claim 1, wherein the control unit is further operatively configured to:
  ascertain a pressure in the withdrawal line; and
  open the pressure-vessel valve intermittently as a function of the pressure in the withdrawal line.

3. The control unit according to claim 2, wherein the control unit is further operatively configured to:
  detect that the pressure in the withdrawal line is reaching or falling below a lower limiting pressure value; and
  in response thereto, bring about an energy pulse in order to open the pressure-vessel valve intermittently.

4. The control unit according to claim 1, wherein the control unit is further operatively configured to:
  ascertain state data with respect to a present state of the pressure-vessel system; and
  bring about an energy pulse depending on the state data, in order to open the pressure-vessel valve intermittently.

5. The control unit according to claim 4, wherein the state data comprises at least one of:
  information with respect to a present pressure in the withdrawal line;
  information with respect to a present pressure in the pressure vessel; or
  information with respect to a temperature of the fuel.

6. The control unit according to claim 4, wherein
the control unit is further operatively configured to set one or more parameters of the energy pulse as a function of the state data; and
the one or more parameters comprise at least one of:
  a current intensity of a current brought about for opening the pressure-vessel valve;
  a voltage value of a voltage brought about for opening the pressure-vessel valve;
  a duration of the energy pulse; or
  an electrical power and/or an electrical energy of the energy pulse.

7. The control unit according to claim 4, wherein
the control unit is further operatively configured to bring about the energy pulse as a function of the state data, in order to:
set a pressure in the withdrawal line to a predefined upper limiting pressure value; and/or
bring about an increase in pressure in the withdrawal line by a predefined amount of differential pressure.

8. The control unit according to claim 4, wherein
the control unit is further operatively configured to bring about the energy pulse as a function of predefined characteristic data for the pressure-vessel system; and
the characteristic data for a plurality of different possible state data indicate in each instance parameter values for one or more parameters of the energy pulse.

9. The control unit according to claim 8, wherein
the characteristic data were ascertained experimentally in advance; and/or
the characteristic data were ascertained in order to bring about in each instance, starting from a present state of the pressure-vessel system indicated by state data, an increase in pressure in the withdrawal line by a predefined amount of differential pressure and/or to a predefined upper limiting pressure value.

10. The control unit according to claim 1, wherein
the pressure-vessel valve exhibits a pilot seat and a main seat;
the mass flow of fuel out of the pressure vessel is less when the pilot seat of the pressure-vessel valve is open than when the main seat of the pressure-vessel valve is open;
the opening of the pilot seat causes slighter wear of the pressure-vessel valve than the opening of the main seat; and
the control unit is further operatively configured to open the pressure-vessel valve intermittently in such a way that during the implementation of the power-reduced mode of operation:
  the main seat is not opened or the main seat is never opened at least temporarily; and/or
  only the pilot seat is opened at least temporarily or exclusively.

11. The control unit according to claim 1, wherein
the pressure-vessel system comprises a first pressure-vessel valve and a second pressure-vessel valve; and
the control unit is further operatively configured to open intermittently the first pressure-vessel valve at least temporarily and the second pressure-vessel valve at least temporarily during implementation of the power-reduced mode of operation of the energy converter and/or during a plurality of successive implementations of the power-reduced mode of operation.

12. The control unit according to claim 1 wherein the control unit is further operatively configured to:
  determine that a power mode of operation is present, wherein the mass flow of fuel for supplying the energy converter in the power mode of operation is greater than the predefined mass-flow threshold value; and
  induce the pressure-vessel valve to remain permanently open during the implementation of the power mode of operation, in order to direct fuel out of the pressure vessel into the withdrawal line.

13. The control unit according to claim 1, wherein
the fuel includes hydrogen;
the energy converter includes a fuel cell; and
the power-reduced mode of operation includes a frost conditioning of the fuel cell.

14. The control unit according to claim 1, wherein the control unit is further operatively configured to:
  ascertain mass-flow information with respect to a mass flow of fuel into the energy converter; and
  bring about the intermittent opening of the pressure-vessel valve during the implementation of the power-reduced mode of operation as a function of the mass-flow information, such that a mass flow of fuel out of the pressure vessel, provided by opening the pressure-vessel valve, corresponds, at least on average over time, to the mass flow of fuel into the energy converter.

15. A pressure-vessel system, comprising:
at least one pressure vessel with a pressure-vessel valve which is designed to direct fuel out of the pressure vessel into a withdrawal line that supplies an energy converter; and
a control unit according to claim 1,
wherein the control unit triggers the pressure-vessel valve.

16. A method for operating a pressure-vessel valve of a pressure vessel, the pressure-vessel valve being designed to direct fuel out of the pressure vessel into a withdrawal line that supplies an energy converter, the method comprising:

determining that a power-reduced mode of operation of the energy converter is present, wherein a mass flow of fuel for supplying the energy converter in the power-reduced mode of operation is less than or equal to a predefined mass-flow threshold value; and causing the pressure-vessel valve to be opened intermittently during the implementation of the power-reduced mode of operation, in order in each instance to direct a surge of fuel out of the pressure vessel into the withdrawal line, such that:

(i) a pressure in the withdrawal line does not exceed a predefined upper limiting pressure value, wherein the upper limiting pressure value is less than an internal pressure in the pressure vessel; and/or (ii) the pressure in the withdrawal line is always lower than the internal pressure in the pressure vessel by at least a predefined offset value;

ascertaining, after conclusion of the power-reduced mode of operation, line sensor data with respect to a development over time of the pressure in the withdrawal line, wherein the pressure-vessel valve is closed after conclusion of the power-reduced mode of operation;

detecting on the basis of the line sensor data a rise in the pressure in the withdrawal line over time; and based thereon, determining that the pressure-vessel valve is leaking.

* * * * *